May 26, 1964   H. G. SMITH   3,134,423
IGNITION ARRANGEMENT FOR POT-TYPE LIQUID FUEL BURNER
Filed July 5, 1961
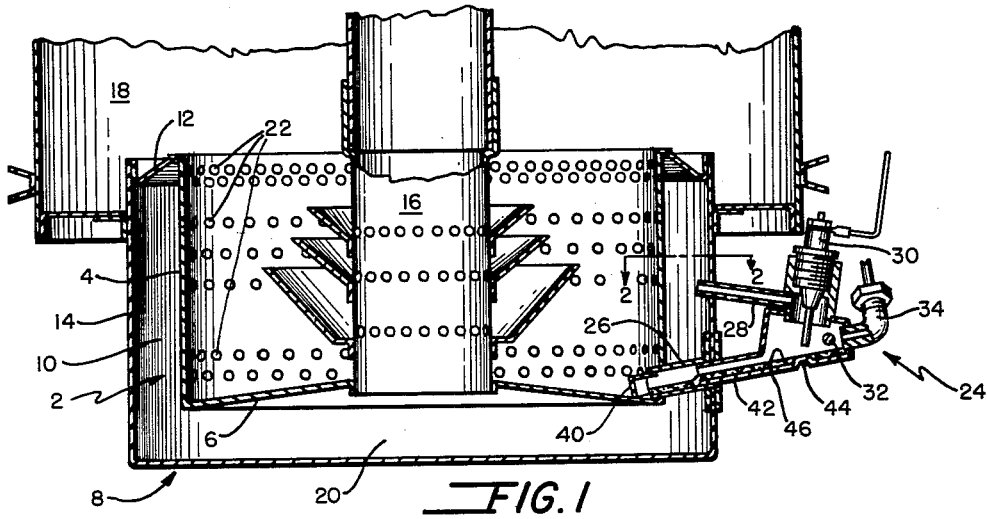
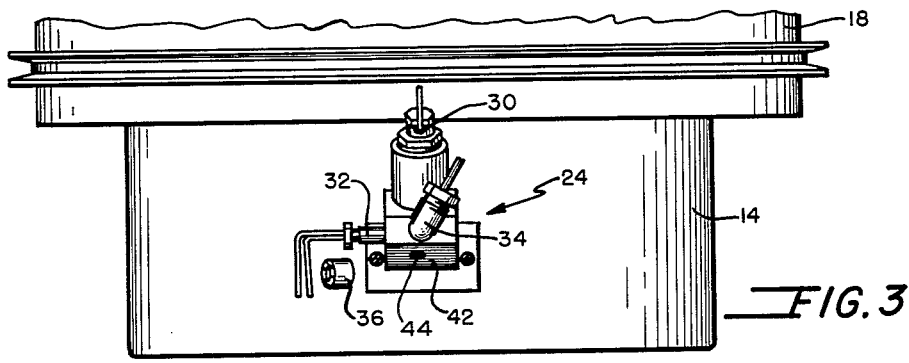
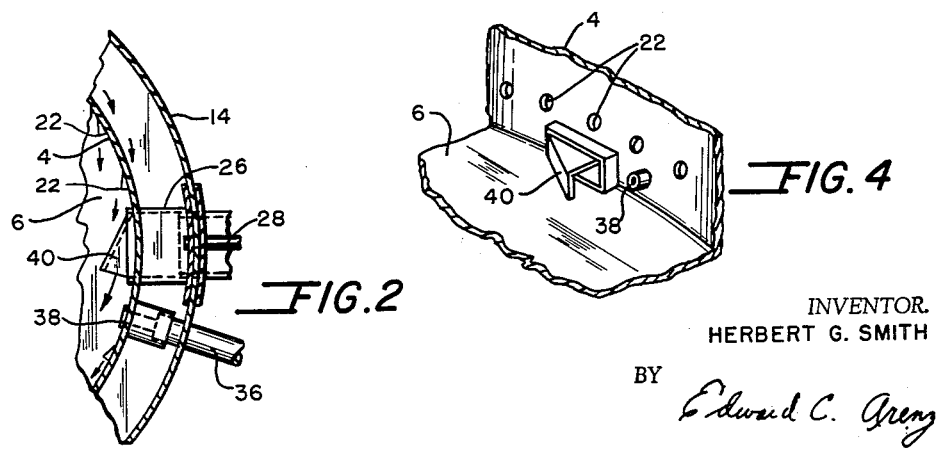
INVENTOR.
HERBERT G. SMITH
BY Edward C. Greny
ATTORNEY 3,134,423
IGNITION ARRANGEMENT FOR POT-TYPE
LIQUID FUEL BURNER
Herbert G. Smith, Moline, Ill., assignor to American Air
Filter Company, Inc., Louisville, Ky., a corporation of
Delaware
Filed July 5, 1961, Ser. No. 121,941
7 Claims. (Cl. 158—91)

This invention relates generally to air heaters of the pot burner type and relates particularly to an electrical ignition arrangement for such a burner.

The principal object of the invention is to provide an improved ignition arrangement which is reliable and effective but of relatively simple and inexpensive construction.

Another object is the provision of an improved ignition arrangement utilizing a part of the forced draft supply of combustion air to force ignited fuel into the pot burner and to provide a continual draft of air through an ignition chamber during operation of the burner so that fouling of the ignition elements by the deposit of soot and carbon is prevented.

Another object is the provision of an ignition arrangement wherein the ignited fuel from the ignition chamber is discharged into the pot in a generally chordal direction across the outlet from the main fuel supply line and an area where fuel first accumulates.

Other objects and features will be appreciated from the description of one embodiment incorporating the principles of the invention by way of example and which is illustrated in the accompanying drawing wherein:

FIGURE 1 is a vertical sectional view of a pot burner and associated structure to which the ignition arrangement of the invention is applied;

FIGURE 2 is a fragmentary horizontal sectional corresponding to a view taken along the lines 2—2 of FIGURE 1;

FIGURE 3 is a side elevational view illustrating the disposition of the ignition chamber and associated parts relative to the burner casing; and FIGURE 4 is a fragmentary isometric view of a portion of a pot interior.

One preferred burner structure and general arrangement of an air heater with which the present invention may be practiced is disclosed in co-pending Hicks' U.S. patent application Serial No. 811,621, issued August 28, 1962, as U.S. Patent 3,051,229. Consequently the parts corresponding thereto will not be described in detail.

In the drawing, the upwardly open, cup-shaped pot burner generally designated 2, having a circumferential wall 4 and bottom wall 6, is concentrically nested within the burner casing 8. The bottom wall of the pot is in the general shape of a truncated cone so that it is raised in its central portion and slopes outwardly with its periphery depressed or at a lower level relative to the rest of the bottom wall. The nesting arrangement of the pot and casing provides a vertical annular space 10, closed at the top by ring 12, between the casing circumferential wall 14 and the pot circumferential wall 4. Forced draft combustion air is supplied to the annular space 10 through a central air supply tube 16 which extends downwardly through the combustion chamber 18 and the pot 2 with its bottom end open to the space 20 between the bottom walls of the pot and casing. The vertically spaced rows of holes 22 in the circumferential wall 4 of the pot permit combustion air from the annular space to flow into the pot. Preferably the arrangement of holes 22 conforms to the described hole arrangement in the noted co-pending Hicks' U.S. patent application (now U.S. Patent 3,051,229) so that the combustion air sweeps tangentially around the pot in a particular direction which, for present purposes, will be assumed to be in a clockwise direction as viewed looking down upon the pot interior and as indicated by the directional arrows (FIGURE 2).

The basic ignition arrangement includes: an ignition chamber 24 secured to the exterior of the casing circumferential wall 14; a flame passage 26 extending from the ignition chamber through the annular space 10 to the pot interior; an air supply tube 28 connecting the interior of the ignition chamber with the annular space so that part of the pressurized air in the annular space will flow into and through the ignition chamber; a fuel igniter in the form of a spark plug 30; an electrical resistance heating element 32 for vaporizing fuel upon its admission to the ignition chamber; and an auxiliary fuel line 34 connected to the outer end of the ignition chamber adjacent the heating element 32 to supply fuel, at a metered rate, through a discharge orifice in the end of the auxiliary fuel line.

Fuel flow to both the ignition chamber and the pot is under the force of gravity from an elevated fuel tank (not shown). The main fuel line 36 (FIGURES 2 and 3) extends through the casing wall 14 and terminates in a flow control orifice 38 through which fuel is admitted to the periphery of the pot. Both the auxiliary and main fuel line are provided with suitable valves (not shown) for controlling fuel flow according to operating conditions. As shown in FIGURES 2 and 4, the discharge end of the main fuel line is closely adjacent the flame passage outlet from the ignition chamber. The inner end of the flame passage has a deflector element 40 secured therein to extend at an angle across the flame passage outlet so that burning fuel discharged from the passage will be projected downwardly and across the area of the bottom wall 6 upon which fuel is discharged from the main fuel line.

While the form of the ignition chamber 24 may depart somewhat from the form illustrated in the drawing, in its preferred embodiment it has a downwardly inclined bottom wall 42 provided with a ground electrode dimple 44 located opposite the electrode of the spark plug 30. The flow passage 26 is formed of several sections which extend in sealed relation through the annular space 10 with suitable flanges provided for securement to the casing wall 14. The ignition chamber floor 42 and flame passage 26 floor are covered with asbestos wicking material 46 extending all the way from the outer end of the ignition chamber to the outlet end of the flame passage. Part of the fuel admitted to the ignition chamber is not vaporized at the outer end thereof and thus flows downwardly and saturates the wicking for its entire length. The outer end of the ignition chamber, where the fuel is admitted and the resistance heating element 32 is disposed, is relatively confined so that the fuel admitted to the chamber will be subjected to a sufficiently high degree of heat from the closely positioned resistance element that the fuel will be vaporized.

When it is desired to fire the burner, the valves in the main fuel line and auxiliary fuel line are opened and the heater coil and spark plug are energized. Fuel entering the ignition chamber and absorbed by the asbestos wicking is subjected to sufficient heat from the heater element to cause some of this fuel to vaporize. As the vaporized fuel passes through the gap between the spark plug electrode and the dimple ground, it will be ignited and then forced through the flame passage by the draft of air entering the ignition chamber through the air supply tube from the annular space. The burning fuel discharged out of the flame passage is deflected in a generally downward and chordal direction within the pot across the small amount of fuel which has gathered in the depressed periphery of the pot underlying the outlet of the main fuel supply line. This in turn causes vaporization and ignition of this fuel in the pot. Since combustion in the pot, once established, is self-sustaining so long as additional fuel is supplied, the supply of fuel to the ignition chamber, and energization of the heating element and igniting element, may then be terminated. However, the flow of air through the ignition chamber will continue while the draft of combustion air continues. This air flow prevents fouling of elements in the ignition chamber by combustion impurities generated in the pot.

It will be appreciated that the forced draft supply of air to the ignition chamber permits vaporization and ignition to take place readily within the chamber even though the chamber is rather small. The pressurized ignition chamber also permits the use of a cross sectionally small flame passage which minimizes the obstruction in the annular space 10. The provision of the wicking material along the entire length of the flame passage insures a supply of fuel available for vaporization and ignition for the entire length of the flame passage which in turn assures retention of a fire in the flame passage and the continued propagation of the flame to the pot during the ignition operation. This is particularly advantageous under cold start conditions with relatively low temperatures when a flame passing through the flame passage might otherwise be snuffed out.

The invention claimed is:

1. In an air heater of the type having a circular burner pot to which a forced draft of combustion air is supplied: a pot floor having a depressed portion at its periphery; main fuel line means having an outlet opening above a first peripheral location of said depressed portion for admitting fuel by gravity flow to said location; a fuel ignition chamber beside said burner pot; auxiliary fuel line means for admitting fuel to said chamber; fuel ignition means in said chamber; ignition chamber air supply means for admitting a portion of said forced draft combustion air thereto; and an ignition chamber discharge passage extending to said pot interior with an outlet alongside said first peripheral location, said outlet having deflector means projecting generally chordally relative to the curve of said pot and shaped to deflect burning fuel in a single chordal direction across said first peripheral location.

2. In a liquid fuel burner of the type having a circular burner pot nested within a casing to form an annular space between the circumferential walls thereof and to which space air for combustion is forced: means forming a depressed area in the bottom wall of said burner pot adjacent the periphery thereof; a main fuel line having an outlet opening above a first peripheral location of said depressed area for supplying fuel to said location; a fuel ignition chamber on the side of said casing; an auxiliary fuel line for supplying fuel to said ignition chamber; means for igniting said fuel supplied to said ignition chamber; means connecting said annular space with said ignition chamber to create a draft of air therethrough; a flame passage connecting said ignition chamber with said pot interior, the outlet of said flame passage being alongside said first peripheral location; and deflection means at the inner end of said frame passage shaped to deflect the ignited fuel exiting from said flame passage in a single chordal direction relative to the curve of said pot across said first peripheral location.

3. In an air heater of the type having a burner pot to which a forced draft of combustion air is supplied: a burner casing; a circular burner pot, having a truncated cone-shaped bottom wall and a circumferential wall, nested in said casing to form an annular space between the circumferential walls of said pot and said casing, said circumferential wall of said pot having aperture means for admitting air from said annular space into said pot; means for supplying said annular space with a part of said forced draft combustion air; main fuel supply means having an outlet opening above a first peripheral location on said bottom wall of said burner pot for admitting fuel to said location; an ignition chamber on the exterior of said casing; means for supplying fuel to said ignition chamber; means for igniting said fuel supplied to said ignition chamber; an air supply tube connecting said annular space to said ignition chamber; a flame passage connecting said ignition chamber to said burner pot interior to admit said ignited fuel to said burner pot alongside said first peripheral location; and deflection means at the inner end of said flame passage shaped to deflect said ignited fuel in a single chordal direction relative to the curve of said pot across said first peripheral location.

4. The air heater specified in claim 3 wherein: said apertures in the circumferential wall of the burner pot are canted to admit air in a swirling motion into said pot; and said deflection means directs said ignited fuel in the same direction.

5. The combination of a liquid fuel burner of the circular pot type and an ignition arrangement therefor comprising: a truncated cone-shaped floor for said pot providing a depressed periphery; pot fuel supply means having an outlet opening above a first location of said depressed periphery for supplying fuel to said location; a pot-shaped casing in which said pot is nested to form an annular space between the circumferential wall thereof; means to supply said annular space with a forced draft of air; an ignition chamber mounted on the exterior of said casing, said chamber having a bottom wall sloping downwardly toward said pot; an air supply tube connecting said annular space with said ignition chamber; a flame passage connecting said ignition chamber with said pot interior, said flame passage outlet being alongside the outlet of said fuel supply means to said pot and closely adjacent said floor; means for supplying fuel to the outer end of said ignition chamber; means for igniting said fuel in said ignition chamber; and deflection means at the outlet end of said flame passage shaped to direct fire exiting therefrom downwardly, and in a single chordal direction relative to the curve of said pot, across the portion of said depressed periphery to which fuel is discharged from said pot fuel supply means.

6. The combination specified in claim 5 wherein: said ignition chamber has a progressively smaller interior cross-section toward said outer end; heater means is provided closely adjacent said outer end to vaporize fuel admitted thereto; and said ignition means is a spark gap type igniter between said heater and said flame passage.

7. The combination specified in claim 6 including: wicking material substantially covering the bottom wall of said ignition chamber and the length of said flame passage.

References Cited in the file of this patent
UNITED STATES PATENTS

| | | |
|---|---|---|
| 1,408,277 | Ensign | Feb. 28, 1922 |
| 1,427,059 | Bridgford et al. | Aug. 22, 1922 |
| 2,388,907 | De Lancey | Nov. 13, 1945 |
| 2,659,428 | Judson | Nov. 17, 1953 |
| 2,729,282 | Lennox | Jan. 3, 1956 |
| 2,966,943 | Breese | Jan. 3, 1961 |
| 2,983,313 | Breese | May 9, 1961 |